US008819924B1

(12) United States Patent
Grine et al.

(10) Patent No.: US 8,819,924 B1
(45) Date of Patent: Sep. 2, 2014

(54) TORSION ELIMINATING COMPRESSION DEVICE FOR CABLE

(75) Inventors: Wayne R. Grine, Crownsville, MD (US); Michael A. Jacobsen, Millersville, MD (US); Garrett M. Jordan, Leesburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 813 days.

(21) Appl. No.: 13/083,712

(22) Filed: Apr. 11, 2011

Related U.S. Application Data

(60) Provisional application No. 61/385,005, filed on Sep. 21, 2010.

(51) Int. Cl.
*B23P 19/00* (2006.01)
*H01R 43/00* (2006.01)

(52) U.S. Cl.
USPC .................. 29/750; 29/268; 29/758; 29/857; 81/487

(58) Field of Classification Search
CPC .. H01R 43/042; H01R 43/26; H05K 13/0007; B25B 7/02; B25B 27/142
USPC ......... 29/240, 268, 750, 758, 857; 72/409.14; 81/487
See application file for complete search history.

(56) References Cited

U.S. PATENT DOCUMENTS

| | | | | |
|---|---|---|---|---|
| 3,094,774 | A * | 6/1963 | Nazarow et al. | 29/752 |
| 3,177,567 | A * | 4/1965 | Gehrman | 29/750 |
| 3,777,348 | A | 12/1973 | Stone | |
| 5,647,119 | A * | 7/1997 | Bourbeau et al. | 29/751 |
| 7,488,296 | B1 | 2/2009 | Van Andel | |

* cited by examiner

*Primary Examiner* — Donghai D Nguyen
(74) *Attorney, Agent, or Firm* — Dave A. Ghatt

(57) ABSTRACT

A method and device for eliminating torsion during the servicing of cable heads. The device is a tool with a handle portion and clamping members having an opening and gripping surfaces for receiving and gripping two different cable-heads for servicing, such as attachment or detachment. When the handle portion is squeezed and held, the tool provides a compression force substantially parallel to a common central axis of the cable heads. The arrangement of the tool prevents undesired load on the cable heads, optimizes the efficiency of servicing while preventing damage to the cable-heads.

5 Claims, 9 Drawing Sheets

TORSION ELIMINATING COMPRESSION DEVICE FOR CABLE

CROSS-REFERENCE TO RELATED APPLICATIONS

This application claims the benefit of U.S. Provisional Application No. 61/385,005, filed Sep. 21, 2010, which is incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a method and device for eliminating torsion during the servicing of cable heads.

BACKGROUND

The assembling of connectors both on land and underwater is a necessary function during marine vessel operations. When handing cables for example, it is imperative to avoid abrasion, crushing, twisting or kinking. It is known to use strap wrenches to assemble cable connectors. However, this known method of assembly, although effective, also presents difficulties because the strap wrench method may sometimes be difficult to operate. If used improperly, the strap wrenches apply opposing torsion forces on the connector moldings cause the connector pins to bend, which damages the connector and allows the connector to leak. In cables for example, kinks and bends cause increased voltage standing wave ratio and signal loss during system operation. It is desired to have a tool for assembling connectors without the undesired effect of producing torsion forces that damages connector moldings.

SUMMARY

In one aspect, the invention is a tool for eliminating torsion and for holding opposing cable heads during cable connection operations. The tool includes a handle portion having a first substantially L-shaped link and a second substantially L-shaped link, pivotally attached to the first substantially L-shaped link. The tool also includes first and second clamping members. In this aspect, the first clamping member is fixedly attached to the first substantially L-shaped link and the second clamping member is fixedly attached to the second substantially L-shaped link. Each clamping member has an opening having a gripping surface for receiving and gripping a connector molding of a cable head.

In another aspect, the invention is a tool and cable arrangement. The arrangement includes a first cable head having a first connector molding with a male thread arrangement a second cable head having a second connector molding with a female thread arrangement. The first and second cable heads are arranged opposed along a common central axis for the attachment of the male thread arrangement of the first connector molding to the female thread arrangement of the second connector molding. In this aspect, the tool and cable arrangement further includes a tool for eliminating torsion and for holding the opposed cable heads during cable servicing operations. The tool includes a handle arrangement having a first substantially L-shaped link, and a second substantially L-shaped link, pivotally attached to the first substantially L-shaped link. The tool also includes first and second clamping members, wherein the first clamping member is fixedly attached to the first substantially L-shaped link, and the second clamping portion is fixedly attached to the second substantially L-shaped link. In this aspect, each clamping member has an opening having a gripping surface. In this aspect, the first connector molding extends through the opening of the first clamping member and is gripped by the gripping surface of the first clamping member, and the second connector molding extends through the opening of the second clamping member and is gripped by the gripping surface of the second clamping member.

In another aspect, the invention is a method of securely servicing first and second cable heads. The method includes the providing of a first cable head having a first connector molding with a male thread arrangement, and the providing of a second cable head having a second connector molding with a female thread arrangement. The method further includes arranging the first and second cable heads opposed to each other for the attachment of the male thread arrangement of the first connector molding to the female thread arrangement of the second connector molding. In this aspect, the method also includes providing a tool for eliminating torsion and for holding the opposed cable heads during the secure attachment and detachment of the cables. According to the method, the tool is provided with a handle arrangement having pivotally attached first and second substantially L-shaped links, operable by only one hand of a user. The tool is further provided with first and second clamping members, wherein the first clamping member is fixedly attached to the first substantially L-shaped link and the second clamping member is fixedly attached to the second substantially L-shaped link. Each clamping member has an opening with a gripping surface. The method further includes the securing of the first and second connector moldings to the first and second clamping members, respectively, by receiving the connector moldings through the opening and gripping the connector moldings with the respective gripping surfaces. The method also includes squeezing and holding together the pivotally attached first and second substantially L-shaped links of the handle arrangement thereby moving the first and second clamping members together, pulling the respective connector moldings together while exerting a compression force parallel to a common central axis of the connector moldings. The method of securely servicing first and second cable heads further includes rotating the female thread arrangement of the second cable head in a first direction over the male thread arrangement of the first cable head connecting to properly attach the first and second cables.

BRIEF DESCRIPTION OF THE DRAWINGS

Other features will be apparent from the description, the drawings, and the claims.

DETAILED DESCRIPTION

Figure 1A:
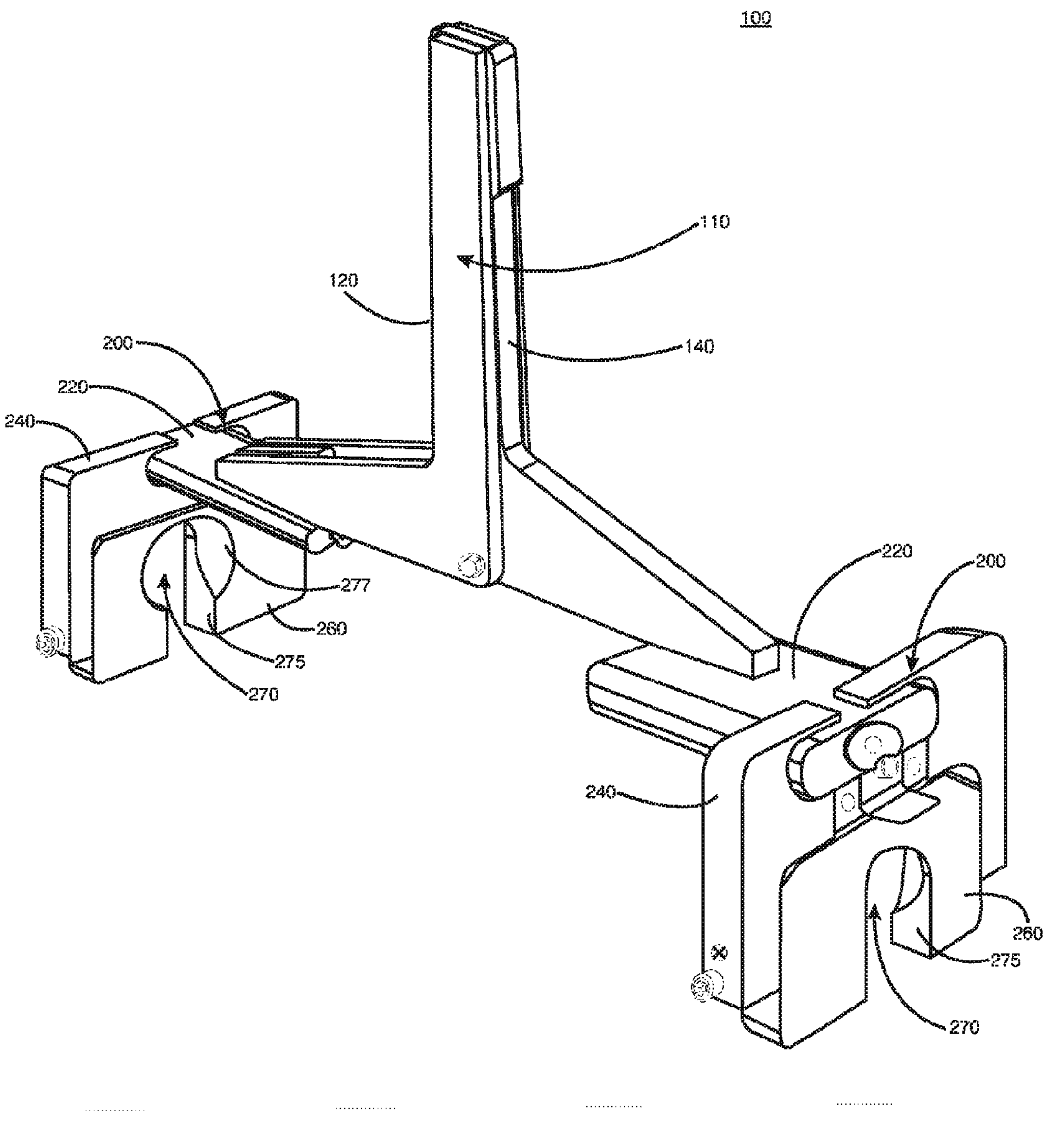
FIG. 1A is an isometric view of a tool for eliminating torsion and for holding opposing cable heads during cable servicing operations, according to an embodiment of the invention.
Figure 1B:
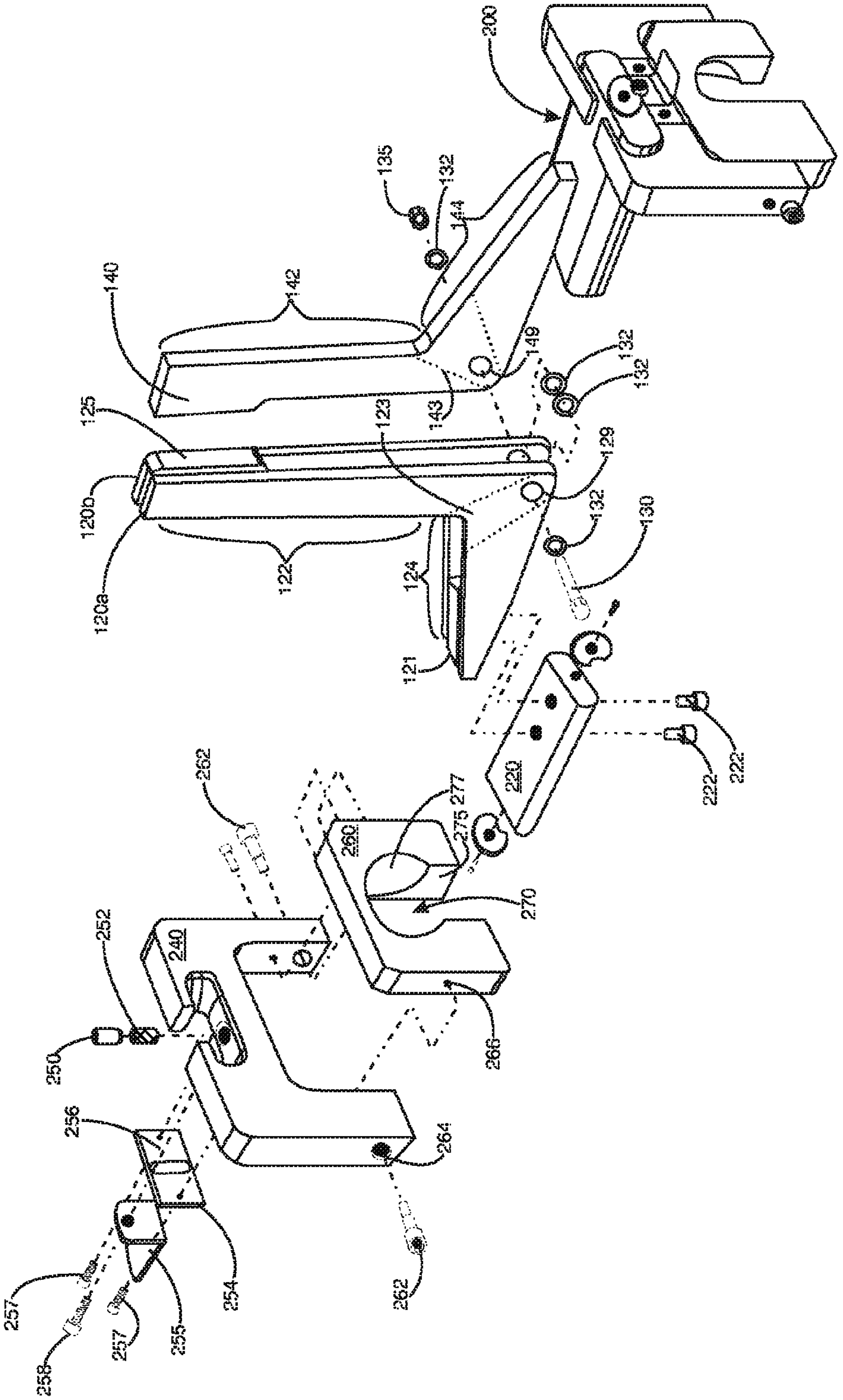
FIG. 1B is an exploded view of a tool for eliminating torsion and for holding opposing cable heads during cable servicing operations, according to an embodiment of the invention.

FIG. 1A is an isometric view of a tool 100 for eliminating torsion and for holding opposing cable heads during cable servicing operations, according to an embodiment of the invention. Cable servicing operations may include the connection and/or the disconnection of male and female cable heads. FIG. 1B is an exploded view of the tool 100. The tool 100 may be made from any desired material. According to an embodiment of the invention, the tool is made from alloys such as aluminum and steel.

As shown in FIGS. 1A and 1B, the tool 100 includes a handle portion 110. The handle portion is made up of a first substantially L-shaped link 120 and a second substantially L-shaped link 140. As outlined below, the user manipulates the handle portion 110 of the tool 100 to operate the tool. FIG. 1B shows each substantially L-shaped link having a control arm that a user holds, and a working arm that is attached to a respective clamping portion. As shown, the first substantially L-shaped link 120 has control arm 122 and working arm 124, the two arms meeting at an apex or elbow region 123. As shown, the control arm 122 is substantially I-shaped, and the working arm 124 has a substantially triangular shape.

Similarly, the second substantially L-shaped link 140 has a control arm 142 and a working arm 144, the two arms also meeting at an apex or elbow region 143. Similar to link 120, as shown, the control arm 142 is substantially I-shaped, and the working arm 144 has a substantially triangular shape. As shown in FIG. 1A, the control arms 122 and 142 each have a length L, and the working arms 124 and 144 have a length l. According to an embodiment of the invention the length L is about 9 in to about 15 in, and the length l is about 4 in to about 8. In one specific embodiment the L is about 12 in and the length l is about 6 inches. The handle portion 110 is dimensioned so that an operator may use a single hand to operate the control arms (122, 142), leaving the user's other hand free to perform servicing functions.

As shown, the tool 100 also includes first and second clamping members 200, which are substantially identical. The first clamping member 200 is attached to the working arm 122 of the first substantially L-shaped link 120. The second clamping member 200 is attached to the working arm 144 of the second substantially L-shaped link 140. As outlined below, when attaching cable connectors, the first and second clamping members 200 are used to provide a compressive force, without adding undue torsion on the respective connection moldings.

The exploded illustration of FIG. 1B shows the working relation among the different elements of the tool 100. As shown, the first substantially L-shaped link 120 is actually formed from two flat plate like members 120*a* and 120*b*, which are separated by stopping plates 121 and 125, thereby forming a hollow member with an opening 129. The stopping plate 121 may be a flat rectangular plate, and the stopping plate 125 may be a triangular plate that corresponds to the shape of the working arm 124. FIG. 1B also shows the second substantially L-shaped link 140 being a flat plate. The dimensions of the substantially L-shaped links 120 and 140 are such that the flat second substantially L-shaped link 140 fits within the opening 131 of the first substantially L-shaped link 120. As shown, the opening 131 has a width w and the second substantially L-shaped link 140 has a thickness t which allows the link 140 to fit within the opening 131. According to an embodiment of the invention, w is about 0.75 in and t is about 0.5 in.

FIG. 1B also shows the links 120 and 140 pivotally attached to each other. A pin 130 extends through pivot openings 129 of the first link 120 and 149 of the second link 140, to enable a pivoting motion between the substantially L-shaped links 120 and 140. FIG. 2B also illustrates washers 132 and knot 135 that properly secure the attachment between the links 120 and 140. It should be noted that other known attachment devices may be used to provide a pivoting arrangement between the links 120 and 140.

Figure 1C:
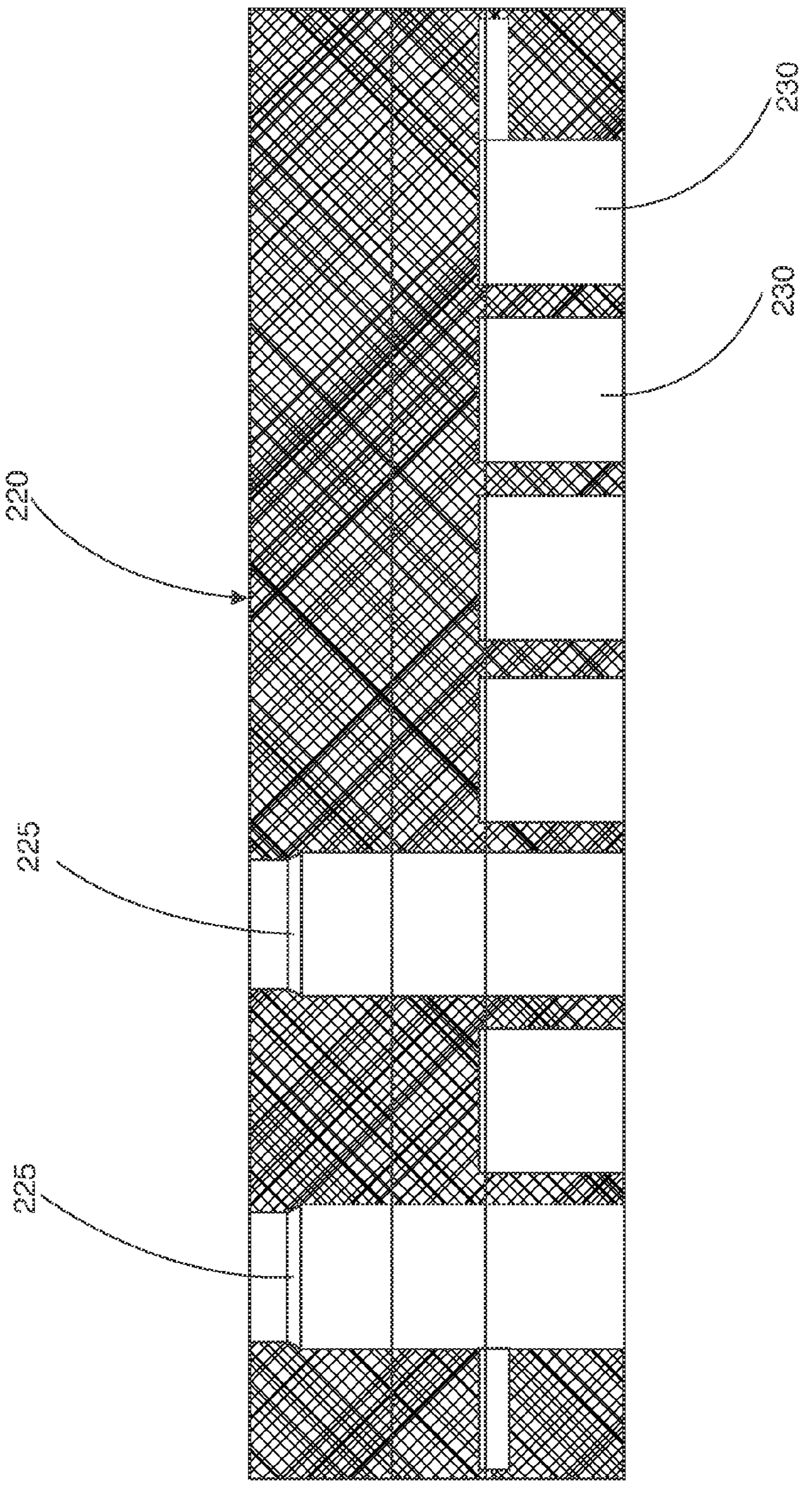
FIG. 1C is a side view of the support track, according to an embodiment of the invention.

FIG. 1B also shows the different elements of the first and second clamping members 200, which are substantially identical. Thus, the description of the first clamping member 200, as outlined below, is the same as the description of the second clamping member 200, with like elements identified with the same reference numerals. As shown, the first clamping member 200 includes a support track 220, a gripper holding member 240, and a gripper 260. As shown, the support track 220 is attached to the working arm 124 of the link 120. The support track 220 is fixedly attached to the link 120 by pins 222 that extend through pin holes 225 in the gripper support track 220 and corresponding holes 127 in the stopping plate 125. The support track 220 also includes a plurality of spaced apart adjustment holes 230, which as outlined below provides adjustability between the support track 220 and the gripper holding member 240. These holes 230 may be equally spaced apart, and may be located in the underside of the support track 220, and may only penetrate to about midway through the body of the support track 220. According to this embodiment, the holes 230 are only visible from the bottom of the support track 220. FIG. 1C, a side view of the support track 220, shows the spaced apart adjustment holes 230, which extend to a midway region of the body of the support track 220. As outlined above, the adjustment holes 230 may be equally spaced apart. FIG. 1C also illustrates pin holes 225 that extend from a bottom portion to a top portion of the support track 220.

The gripper holding member 240 includes a track opening 242 through which the support track 220 slidably extends. The gripper holding member 240 also includes overhanging edges 245 that allows the gripper holding member to cling to the support track 220, thereby providing additional support between the support track 220 and the gripper holding member 240. The gripper holding member 240 also includes a spring loaded pin arrangement that includes a pin 250, a spring 252, a bracket 254 having an elongated opening 256, a lever 255, screws 257, and end cap 258. The pin 250 is positioned within the body of the gripper holding member 240, so that it protrudes out of the body through a pop-up hole 251. The spring 252 biases the pin 250 to extend through the pop-up hole 251. Screws 257 are used to hold the bracket 254 against the body of the holding member 240. The lever 255 is attached to the bracket 254, the holding member 240, and the pin 250, by means of the end cap 258. The lever 255 is slidable with respect to the bracket 254, the elongated opening 256 allowing a sliding in the vertical direction. A user slides the lever 255 to control the vertical positioning of the spring loaded pin 250. Thus, in operation, a user pops the pin 250 into an out of the spaced apart adjustment holes 230, in order to lock the gripper holding member 240 and the attached gripper 260 at a specific position with respect to the track 220. As outlined below, the position of the gripper holding member 240 and the attached gripper is selected based on the dimensions of the connector molding that is being serviced.

FIGS. 1A and 1B show the gripper 260 pivotally attached to the gripper holding member 240. As shown, the gripper 260 is positioned within a substantially U-shaped gripper cavity 255 of the holding member 240, between extending gripper holding arms 259. As shown in the exploded view of FIG. 1B, hinge screws 262 extend through openings 264 and 266 to complete the pivoting arrangement, which allows the gripper to pivot with respect to the holding member 240 within the gripper cavity 255. As outlined below, this pivoting motion allows the gripper to maintain a compression force parallel to a central axis of the connector molding of the cable that is being serviced. Additionally, it should be noted that because of the use of two hinge screws 262 and the overall arrangement of gripper 260 with respect to the gripper holding member 240, pivoting is allowed about only one axis, an axis that extends through a common longitudinal axis of the hinge screws 262.

As shown, the gripper 260 has a front receiving surface 261 which is a planar surface, and a rear receiving surface 263, which is also a planar surface, and is substantially parallel to the front receiving surface 261. The gripper 260 also includes an opening 270 extending from the front receiving surface 261 to the rear receiving surface 263, through which a connector is received. FIGS. 1A and 1B also show the opening 270 having a continuous gripping surface that includes a flat portion 275 and a conical portion 277. As shown, the flat portion 275 of the continuous gripping surface is in a plane that is substantially perpendicular to the planes of the front and rear receiving surfaces 261 and 263. As shown, the diameter D of the conical portion 277 is larger at front receiving surface 261, as compared to the diameter d towards the rear receiving surface 263. As shown in FIG. 1A, the second clamping member 200 is arranged to be mirror-like reflection of the first clamping member 200. Thus, the front receiving surfaces 261 of each of the first and second grippers 260 are positioned so that they face each other.

Figure 2A:
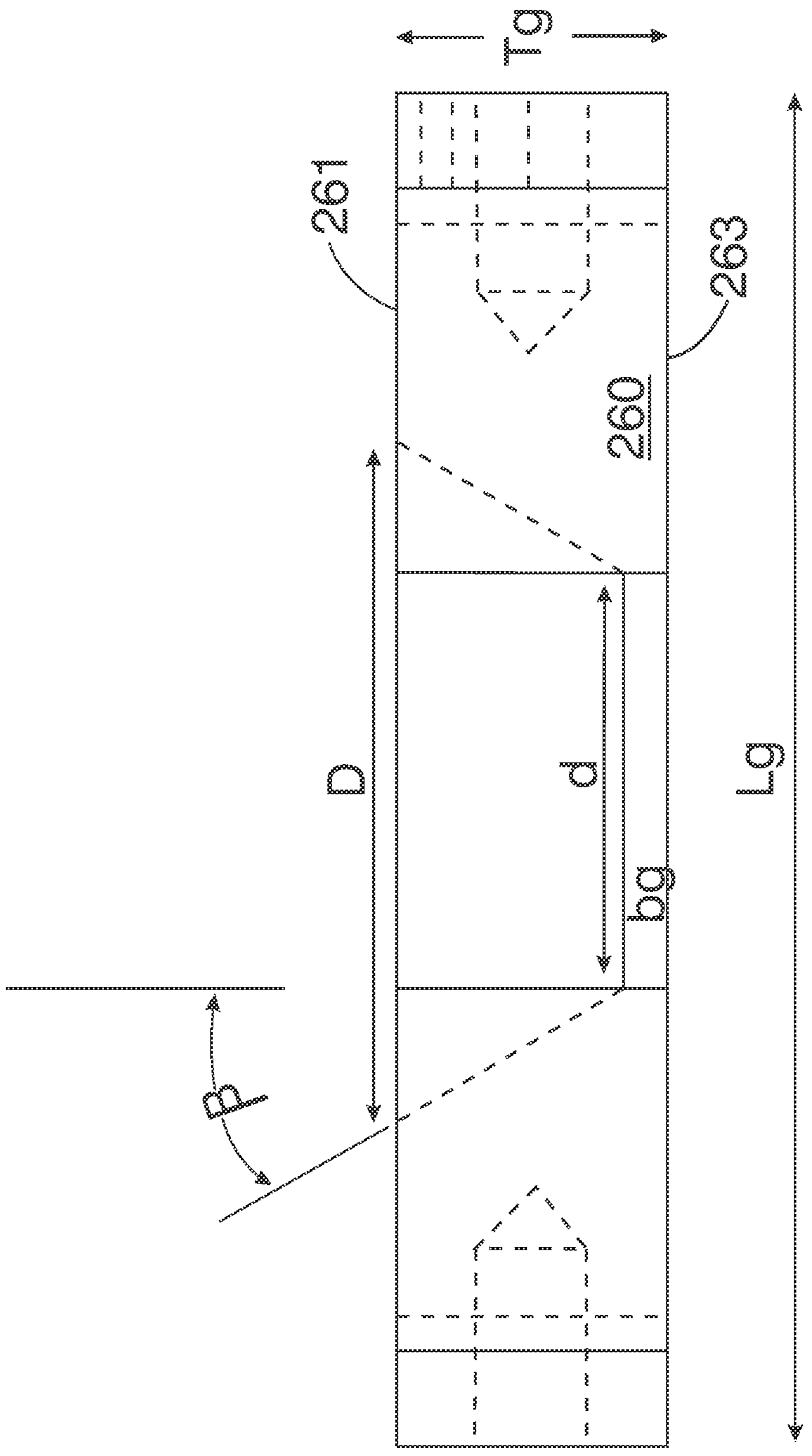
FIG. 2A is an exemplary bottom view of a gripper, according to an embodiment of the invention.
Figure 2B:
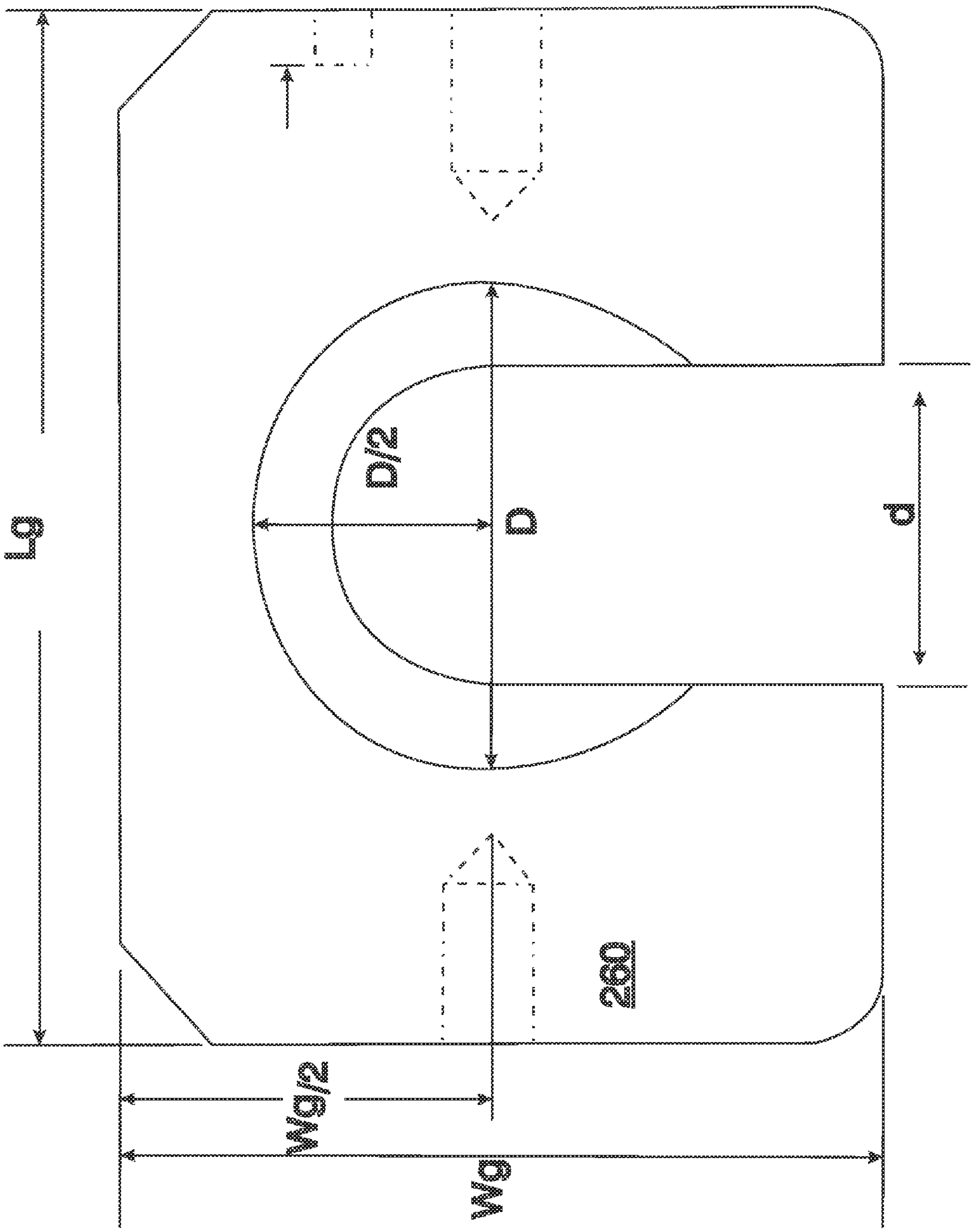
FIG. 2B is an exemplary front view of a gripper, according to an embodiment of the invention.
Figure 2C:
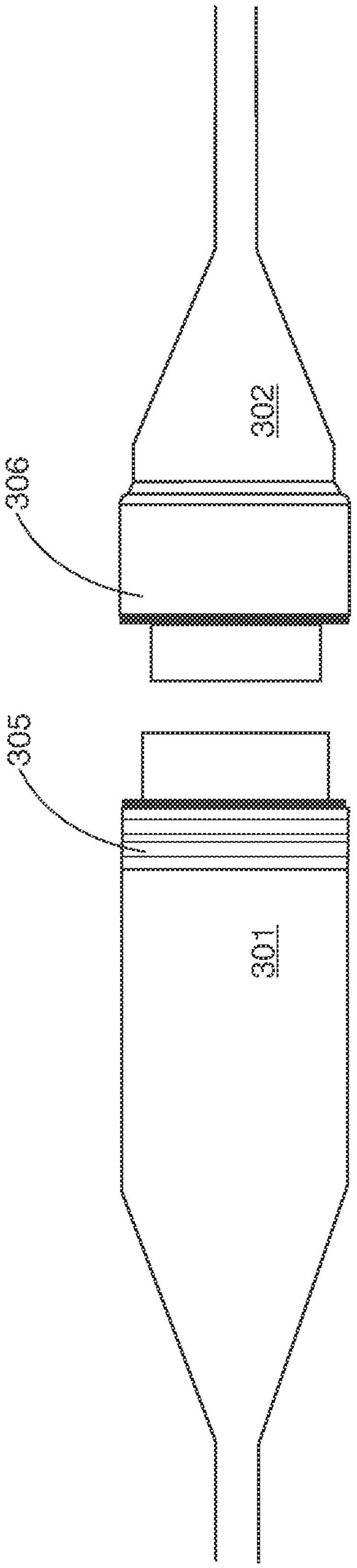
FIG. 2C is an exemplary illustration of a connector molding having a conical portion, according to an embodiment of the invention.

FIG. 2A is an exemplary bottom view of a gripper 260, showing the conical surface portion 277 and the conical slope β. FIG. 2B is an exemplary front view of a gripper 260, showing the conical surface portion 277. FIGS. 2A and 2B also show different dimensions of the gripper 260, including the diameter D of the conical portion at the front of the receiving surface 261 and the diameter d towards the rear receiving surface 263. FIG. 2A shows the gripper having a thickness $T_g$ and a length $L_g$. FIG. 2B also shows the gripper length $L_g$. FIG. 2A also shows a thickness $t_g$ of an arc portion towards rear receiving surfaces. FIG. 2B also shows the gripper width $W_g$. According to an embedment of the invention, the diameter D is about 1.8 in to about 2.1 in, the diameter d is about 1.2 in to about 1.3 in, the thickness $T_g$ is about 0.7 in to about 0.8 in, the thickness $t_g$ is about 0.10 to about 0.15, the length $L_g$ is about 3.8 in to about 4.1 in, and the width $W_g$ is about 2.9 in to about 3.1 in. Additionally, the conical slope β may be about 15 to about 45 degrees. FIG. 2C is an exemplary illustration of male and female connector moldings 301 and 302 arranged for attachment to each other, the moldings 301 and 302 having conical portions 307 and 308, respectively, commensurate with the conical portion 277 of the gripping surface of gripper 260. Thus the connector moldings 301 and 302 may also have a conical slope of about β. As outlined below, the conical portion 277 of the gripper 260 gripper may be used to grip conical portions 307 and 308.

Figure 3A:
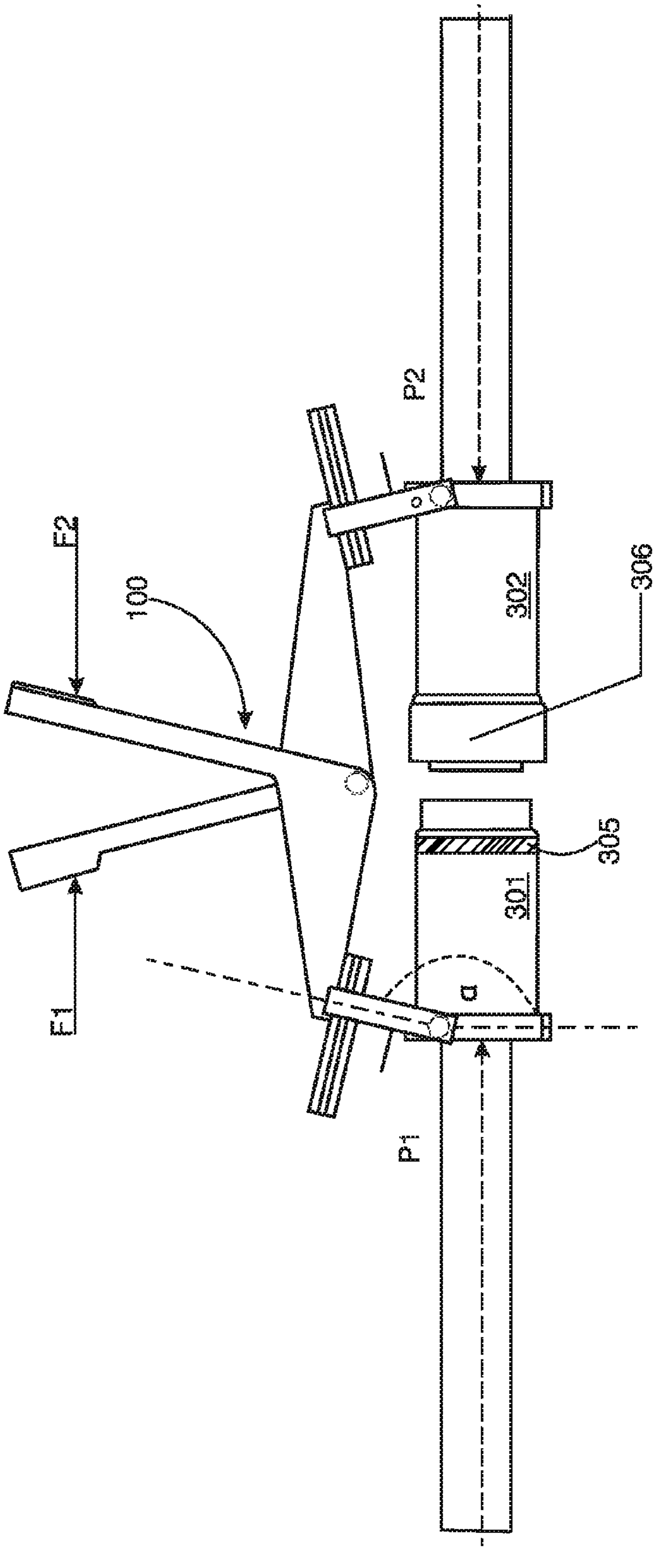
FIG. 3A is an exemplary illustration of a tool and connector arrangement, according to an embodiment of the invention.

FIG. 3A is an exemplary illustration of a tool and connector arrangement 222, prior to servicing the connector arrangement, according to an embodiment of the invention. As shown, the arrangement 222 includes a tool 100 and male and female connector moldings 301 and 302, which are cable head portions of cables that are being serviced. In the instant arrangement, the male and female connector moldings 301 and 302 are to be connected. FIG. 3A also shows a surface 201 upon which the tool 100 and/or the connector moldings 301 and 302 may rest. Because the instant invention is directed towards both land and underwater environments, the surface 201 may be a land or an underwater surface. FIG. 3A shows the tool 100 with the first and second control arms 122 and 142 of the respective substantially L-shaped links 120 and 140, in a pivoted-apart orientation. FIG. 3A also shows each clamping member 200 securing a connector molding (301, 302) within the respective gripper 260. As outlined above, each connector molding may include a conical portion (307, 308), which is gripped by a matching conical portion 277 of the gripping surface of the respective gripper 260.

FIG. 3A further illustrates variable angle α formed between the gripper 260 and the gripper holding member 240. As shown, the male and female connector moldings 301 and 302 are maintained in a direction that is substantially parallel to the surface 201, which prevents the application of undesired torsion on the connector moldings 301 and 302.

In operation, a user applies squeezing forces $F_1$ and $F_2$, as shown, to the control arms 122 and 142 of the substantially L-shaped links 120 and 140. Because of the dimensions and design of the L-shaped links 120 and 140, a user may use only one hand to apply the squeezing forces $F_1$ and $F_2$. The application of the squeezing forces $F_1$ and $F_2$ creates resulting pushing forces $P_1$ and $P_2$, pushing the cable connection heads together. As shown, the pushing forces $P_1$ and $P_2$ are directed substantially through and parallel with a central longitudinal axis X that is common to both male and female connector moldings 301 and 302. The ability of the gripper 260 to pivot at variable angle α with respect to the gripper holding member 240 allows the tool 100 to apply the pushing forces $P_1$ and $P_2$ along the central longitudinal axis X. The application of the pushing forces $P_1$ and $P_2$ in the illustrated direction, which is also substantially parallel to the surface 201, prevents the application of undesired torsion on the connector moldings 301 and 302.

Figure 3B:
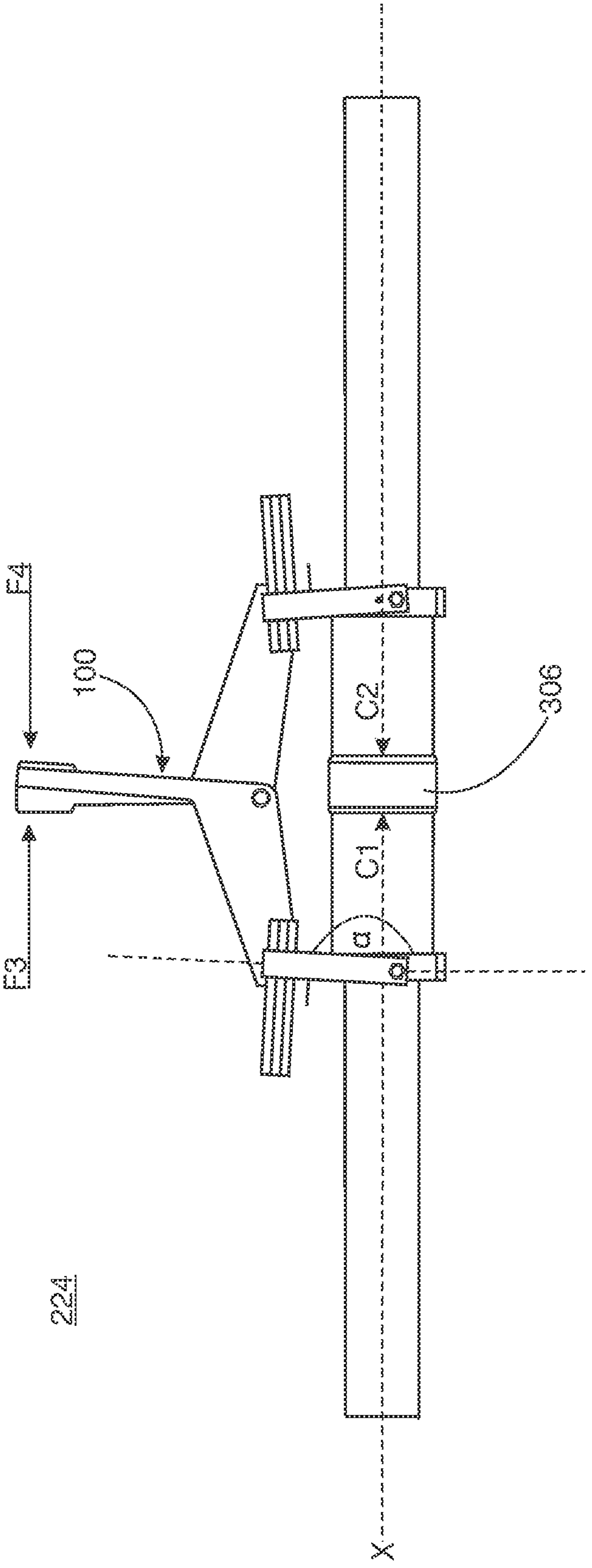
FIG. 3B is an exemplary illustration of a tool and connector arrangement 224, after the user applies squeezing forces, according to an embodiment of the invention.

FIG. 3B is an exemplary illustration of a tool and connector arrangement 224, after the user applies squeezing forces $F_1$ and $F_2$ and moves the connector arrangement into a servicing position, according to an embodiment of the invention. Thus, FIG. 3B illustrates the tool and connector arrangement in a servicing orientation. As shown, holding forces $F_3$ and $F_4$ may be continuously applied to maintain the male and female connection moldings 301 and 302 in illustrated orientation. FIG. 3B shows the male and female connection moldings 301 and 302 contacting each other, with compression forces $C_1$ and $C_2$ exerted on the connection moldings 301 and 302. The compression forces $C_1$ and $C_2$, which compress the connection moldings 301 and 302 together, result from the applied holding forces $F_3$ and $F_4$. As shown, the compression forces $C_1$ and $C_2$ are directed substantially through and parallel with the central longitudinal axis X that is common to both male and female connector moldings 301 and 302. As stated above, the ability of the gripper 260 to pivot at variable angle α with respect to the gripper holding member 240 allows the tool 100 to apply the compression forces $C_1$ and $C_2$ substantially along the central longitudinal axis X. In the illustration of FIG. 3B, the angle α is about 180 degrees.

During servicing operations, when the tool and connector arrangement is as illustrated in FIG. 3B, a user may use one hand to apply the holding forces $F_3$ and $F_4$ and the user may use the other hand to rotate a coupling ring 306 of the female connector 302 over the receiving portion 305 of the male connector 301. The coupling ring 306 and the receiving portion are provided with complementary threading arrangements. Because of the resulting compression forces $C_1$ and $C_2$ substantially parallel to a common longitudinal axes X, the user is able to rotate the coupling ring 306 over the receiving portion 305 so that the thread is under no load. This ensures free rotation of the ring 306 with no binding. Thus, the user continues rotating the ring 306 until the connectors are fully seated. It should be noted that the forces $F_1$, $F_2$, $F_3$, $F_4$, $P_1$, $P_2$, $C_1$ and $C_2$, as outlined above, may be any desired force necessary to provide proper squeezing, holding, pushing, and compression.

Figure 4:
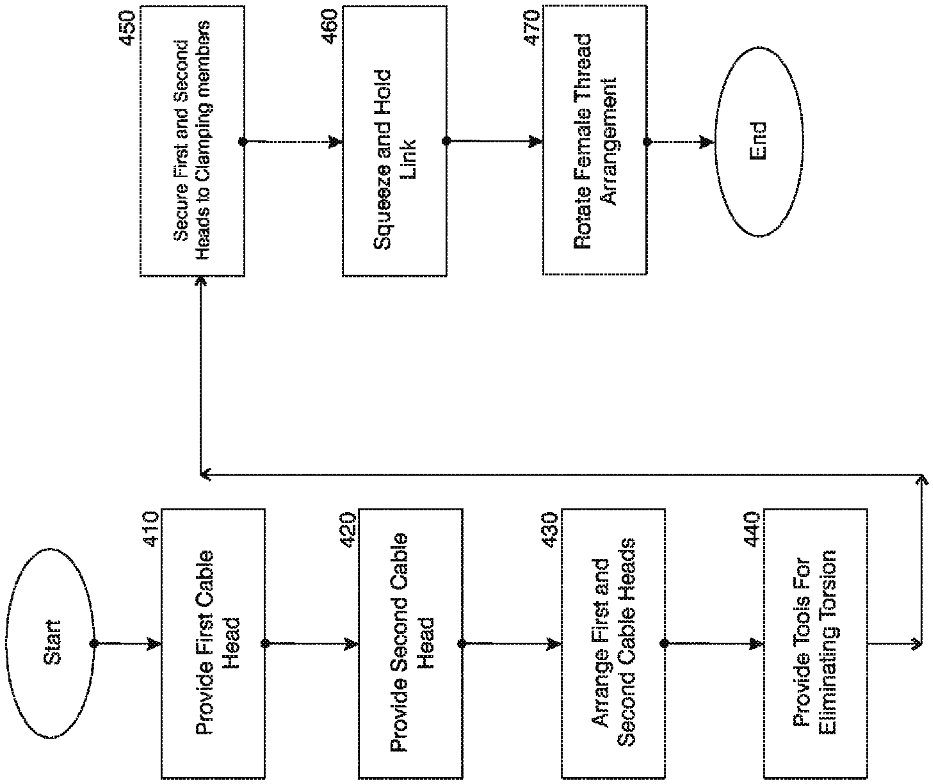
FIG. 4 is a flowchart illustrating a method of securely attaching first and second cable heads, according to an embodiment of the invention.

FIG. 4 is a flowchart illustrating a method 400 of securely attaching first and second cable heads according to an embodiment of the invention. The steps involved in the method 400 of securely attaching first and second cable heads have been outlined above in detail in the description of FIGS. 1A-3C. FIG. 4 merely shows the general steps involved, but is not an all-inclusive illustration of the method 400.

Step 410 is the providing a first cable head having a first connector molding 301 with a male thread arrangement 305. Step 420 is the providing a second cable head having a second connector molding 302 with a female thread arrangement 306. Step 430 is the arranging of the first and second cable heads opposed to each other for the attachment of the male thread arrangement 305 of the first connector molding 301 to the female thread arrangement 306 of the second connector molding 302. The connector moldings 301 and 302 are arranged along a surface 201 as shown in FIG. 3A. The surface 201 may be a land or an underwater surface. The first and second cable heads, as illustrated in FIG. 3A, are spaced apart and opposed to each other in a manner outlined in step 430.

Step 440 is the providing a tool 100 for eliminating torsion and for holding the opposed cable heads during the secure attachment and detachment of the cables. As shown in FIGS. 1A and 1B, the tool 100 includes a handle arrangement 110 having pivotally attached first and second substantially L-shaped links 120 and 140, the handle arrangement 110 operable by only one hand of a user. The tool 100 also includes first and second clamping members 200, wherein the first clamping member is fixedly attached to the first substantially L-shaped link 120 and the second clamping portion 200 is fixedly attached to the second substantially L-shaped link 140. As illustrated in FIGS. 1A and 1B, and as outlined above, each clamping member includes an opening 270 and a gripping surface (275, 277).

Step 450 is the securing of the first and second connector moldings 301 and 302 to the first and second clamping members 200, respectively, by receiving the cable connector moldings (301, 302) through the opening 270 and gripping the connector moldings (301, 302) with the respective gripping surfaces, as shown in FIG. 3A.

Step 460 is the squeezing and holding together of the pivotally attached first and second substantially L-shaped links 120 and 140 of the handle arrangement 110 thereby moving the first and second clamping members 200 together. As outlined above, this squeezing and holding may be performed with only one hand of a user. This movement pulls the respective connector moldings 301 and 302 together, from the orientation shown in FIG. 3A to the position shown in FIG. 3B. When the first and second connector moldings 301 and 302 are pulled together and the first and second substantially L-shaped links 120 and 140 are held together as shown in FIG. 3B, compression forces are applied to the connector moldings 301 and 302. As outlined above, because of the structure of the tool 100, the compression forces are substantially parallel to a common central axis X of the connector moldings.

Step 470 is the rotating of the female thread arrangement 306 of the second cable head in a first direction over the male thread arrangement 305 of the first cable head connecting to properly attach the first and second cables. As stated above, according to an embodiment of the invention, the holding of the handle portion 110 and the rotating of the female thread arrangement 306 over the male thread arrangement 305 maybe performed simultaneously by a single user. Additionally, the user may use one hand to hold the handle arrangement and the other hand to rotate the cover 305. As stated above, because of the resulting compression forces $C_1$ and $C_2$ substantially parallel to a common longitudinal axes X, the user is able to rotate the coupling ring 306 over the receiving portion 305 so that the thread is under no load. This ensures free rotation of the ring 306 with no binding.

It should be noted that alternatively, the tool 100 may be used to detach already attached connectors. According to this embodiment, the male and female connection moldings 301 and 302 would be held against the surface 201 by the tool 100 in the orientation as shown in FIG. 3B. Holding forces $F_3$ and $F_4$, as shown in FIG. 3B, are applied to the handle portion 110, which creates the compression forces $C_1$ and $C_2$ on the cable heads in a direction substantially parallel to the common axis X. This eliminates torsion forces so the thread is never under load, thereby ensuring free rotation of the ring with no binding. This makes it easier for the user to disconnect the connector moldings 305 and 306 from each other. As outlined above, a single user may use one hand to hold the handle arrangement and the other hand to rotate the coupling ring 306 for disconnection.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A tool and cable arrangement comprising:

a first cable head having a first connector molding with a male thread arrangement a second cable head having a second connector molding with a female thread arrangement, the first and second cable heads arranged opposed along a common central axis for the attachment of the male thread arrangement of the first connector molding to the female thread arrangement of the second connector molding;

a tool for eliminating torsion and for holding the opposed cable heads during cable servicing operations, the tool comprising:

a handle arrangement comprising:

a first substantially L-shaped link; and a second substantially L-shaped link, pivotally attached to the first substantially L-shaped link; and first and second clamping members, wherein the first clamping member is fixedly attached to the first substantially L-shaped link and the second clamping portion is fixedly attached to the second substantially L-shaped link; wherein each clamping member comprises an opening having a gripping surface, with the first connector molding extending through the opening of the first clamping member and being gripped by the gripping surface of the first clamping member, and with the second connector molding extending through the opening of the second clamping member and being gripped by the gripping surface of the second clamping member, wherein each of the first and second clamping members comprise: a support track having a plurality of spaced-apart adjusting holes; a gripper holding member having a spring loaded pin for extending through one of the plurality of openings, the gripper holding member slidable along the support track to position the pin through any of the plurality of spaced-apart adjusting holes to adjust for variations in size of connector moldings; and a gripper pivotally attached to the gripper holding member, wherein the gripper comprises the opening having the gripping surface that receives and grips the respective connector molding.

2. The tool and cable arrangement of claim 1, wherein each of the first and second substantially L-shaped links comprise a control arm that a user controls, and a working arm that is attached to a respective clamping portion, each said control arm connected to a said working arm at an apex region, and wherein the first and second substantially L-shaped links are pivotally attached through the respective apex region, so that when a user moves the control arms towards each other, the working arms move the first and second clamping members towards each other, with the pivotal attachment of the gripper to the gripper holding member allowing the gripper to maintain a compression force parallel to the central axis of the connector molding of the cable head.

3. The tool and cable arrangement of claim 2, wherein each gripper includes a planar front receiving surface, and a planar rear receiving surface substantially parallel to the planar front receiving surface, wherein the opening having the gripping surface extends from the planar front receiving surface to the planar rear receiving surface, wherein the gripper surface is a continuous surface comprising a flat portion and a conical portion, wherein each of the first and second connector moldings include a conical end piece, and wherein the conical portion of each gripper surface contacts a said conical end piece of a connector molding.

4. The tool and cable arrangement of claim 3, wherein in each gripper, the flat portion of the gripper surface is substantially perpendicular to each of the planar front receiving surface and the planar rear receiving surface, and wherein a diameter of the conical portion is larger at the front planar front receiving surface, as compared to a diameter towards the planar rear receiving surface.

5. The tool and cable arrangement of claim 4, wherein each gripper holding member has substantially U-shaped gripper cavity having a pair of extending gripper holding arms, and wherein a said gripper is positioned between the pair of extending gripper holding arms, each of the first and second clamping members further including a pair of hinge screws, wherein each one of said pair of hinge screws extend through an extending gripper arm and through to the said gripper.

* * * * *